Dec. 23, 1930.  F. R. VALPEY  1,786,044
VEHICLE FRONT END ASSEMBLY
Filed Dec. 23, 1929  2 Sheets-Sheet 1
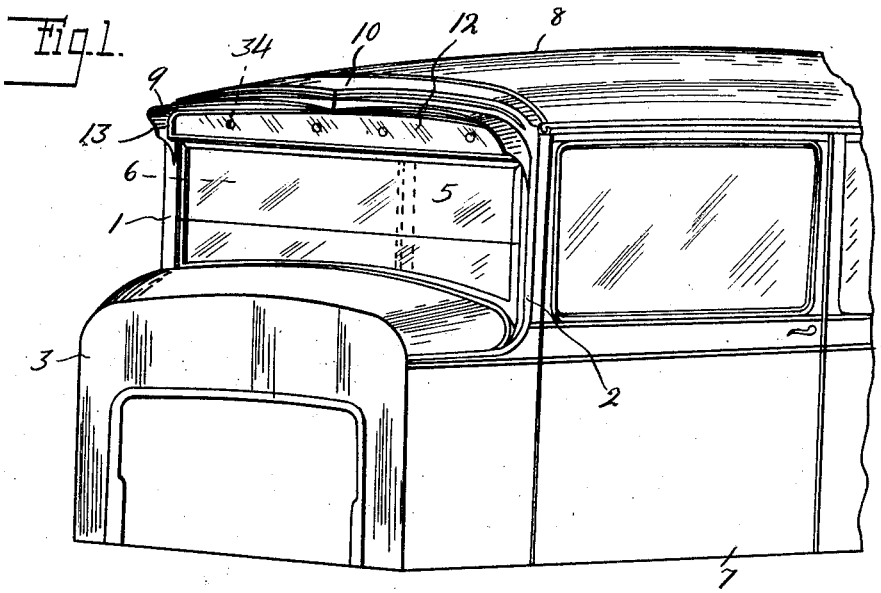
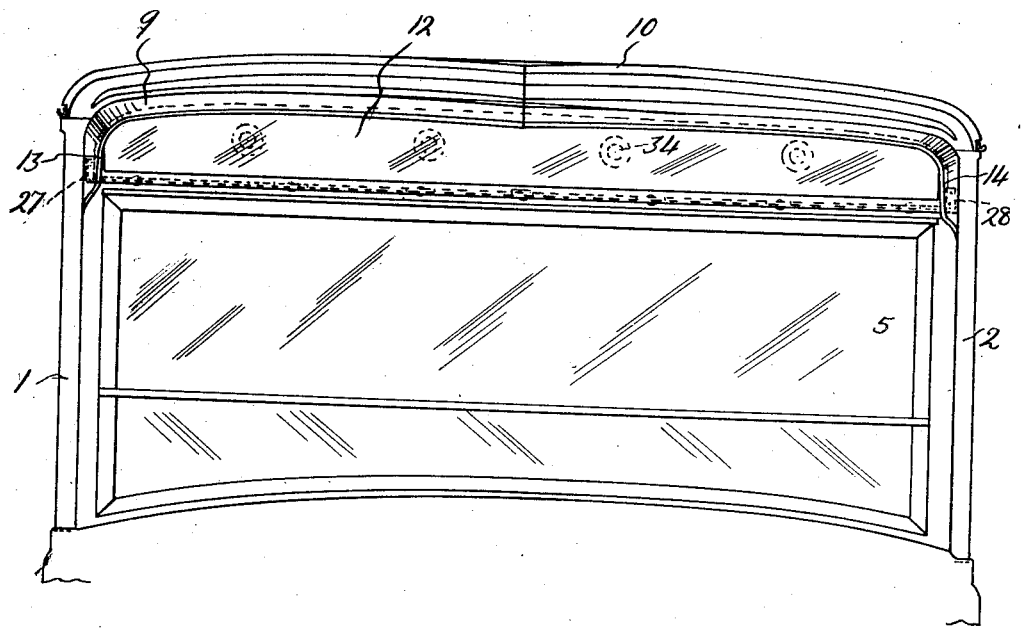
INVENTOR
Frank Russell Valpey
BY
ATTORNEYS Dec. 23, 1930.                F. R. VALPEY                1,786,044
                        VEHICLE FRONT END ASSEMBLY
                          Filed Dec. 23, 1929      2 Sheets-Sheet 2
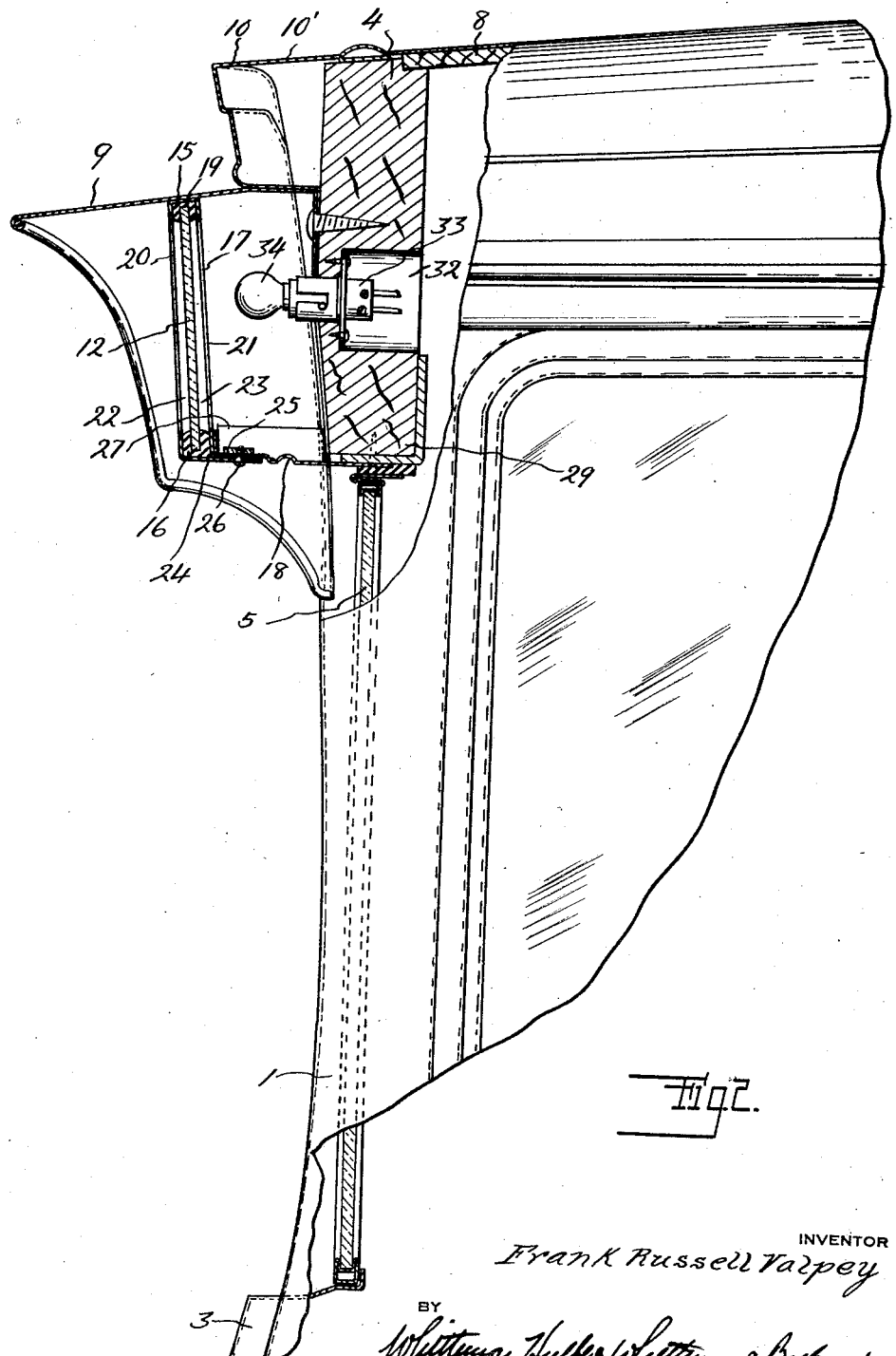

Patented Dec. 23, 1930

1,786,044

UNITED STATES PATENT OFFICE

FRANK RUSSELL VALPEY, OF ROYAL OAK, MICHIGAN, ASSIGNOR TO GRAHAM-PAIGE MOTORS CORPORATION, OF DETROIT, MICHIGAN, A CORPORATION OF MICHIGAN

VEHICLE FRONT-END ASSEMBLY

Application filed December 23, 1929. Serial No. 416,134.

This invention relates generally to vehicle front end constructions, particularly those of commercial type vehicles, and consists of certain novel features of construction, combinations and arrangements of parts that will be hereinafter more fully described and particularly pointed out in the appended claims.

In the accompanying drawings:

Figure 1 is a fragmentary perspective view of a vehicle body with a front end construction embodying my invention;

Figure 2 is an enlarged fragmentary side elevation of the vehicle body and showing parts broken away;

Figure 3 is a front elevation of the construction shown in Figure 2.

Referring now to the drawings, 1 and 2 respectively are the front body pillars, 3 is a cowl projecting forwardly from said pillars at the lower ends thereof, 4 is a windshield header extending between and terminally secured to the pillars at the upper ends thereof, 5 is a sectional windshield closing the space between the cowl 3 and header 4, 6 and 7 respectively are doors hingedly connected to the pillars 1 and 2, 8 is a top resting upon and secured to the header 4, 9 is a sunshield projecting forwardly from the header 4 and pillars 1 and 2, and 10 is a visor projecting forwardly from the header 4 at a point just above the shield 9 and having the top portion 10' thereof extending over the header 4 and secured to the top 8.

12 is a sheet of glass or other transparent material extending between the sides 13 and 14 of the sunshield and arranged substantially parallel to the header 4, 15 and 16 respectively are channels receiving the upper and lower longitudinal edges of the glass panel 12, 17 is a casing for the glass 12 and channels 15 and 16, and 18 is a bridge between the lower edges of the casing 17 and header 4. As shown, the top wall 19 of the casing is relatively narrow and is rigidly secured to the sunshield 9; the front and rear walls 20 and 21 respectively of the casing are substantially parallel and have aligned elongated openings 22 and 23 respectively therein and overlapping substantially horizontal flanges 24 and 25 respectively projecting rearwardly from said front and rear walls at the lower edges thereof and secured by screws 26 to the bridge 18. Preferably the lowermost flange 24 constitutes the bottom wall of the casing and supports the glass 12. The bridge 18 is preferably a sheet of metal clamped upon the header 4 and windshield 5 and having upturned end flanges 27 and 28 respectively secured to the side walls 13 and 14 respectively of the sunshield. In fact, the screws 29 used to attach the windshield 5 to the header 4 serve also as securing means for the bridge 18. Thus a box-like casing A is provided at the front of the vehicle and may be used as an advertising sign. The header 4 constitutes the rear wall of this casing and is preferably provided at spaced points with recesses 32 in which electric light bulb sockets 33 are secured for holding suitable electric light bulbs 34 for illuminating purposes.

In use, any suitable lettering, wording or indicia may be placed upon the glass 12 and may be clearly visible. Thus a permanent advertising medium is provided at the front of the vehicle.

While it is believed that from the foregoing description the nature and advantages of my invention will be readily apparent, I desire to have it understood that I do not limit myself to what is herein shown and described, and that such changes may be resorted to when desired as fall within the scope of what is claimed.

What I claim as my invention is:

1. In a vehicle body front end construction, the combination with a windshield header, and a windshield suspended from said header, of a sheet of transparent material in front of said header bearing indicia, a sunshield projecting forwardly from said header, a frame for said sheet secured to said sunshield and having a rearwardly extending portion, and a support for said sheet including a bridge secured to said rearwardly extending portion and secured between said windshield and header.

2. In a vehicle body front end construction, a windshield header, a bridge projecting forwardly from the header at the lower edge thereof, a sheet of transparent material bearing indicia rising from the bridge in substantially parallel relation to the header, a connection between the upper edge of said sheet and said header, and illuminating means for the sheet projecting forwardly from the header in rear of the sheet.

3. In a vehicle body front end contruction, a windshield header, a bridge projecting forwardly from the header at the lower edge thereof, a sheet of transparent material bearing indicia rising from the bridge in substantially parallel relation to the header, a sunshield projecting forwardly from the header and extending over and upon opposite sides of said sheet, and illuminating means for the sheet including an electric light bulb projecting forwardly from the header and disposed in rear of said sheet.

4. In a vehicle body front end construction, the combination with a windshield header, and a sunshield projecting forwardly from said header, of a bridge projecting forwardly from said header at the lower edge thereof and disposed substantially parallel to the top of said sunshield, a sheet of transparent material disposed between said bridge and the top of said sunshield and arranged directly in front of and substantially parallel to said header, a frame for said sheet secured to the top of said sunshield and to said bridge, said bridge being secured to opposite sides of the sunshield, and illuminating means for the sheet projecting forwardly from the header and disposed in rear of the sheet.

5. In a vehicle body front end construction, a windshield header, a sunshield projecting forwardly from said header, a visor projecting forwardly from said header and straddling said sunshield, a bridge projecting forwardly from said header at the lower edge thereof and having marginal flanges secured to opposite sides of said sunshield, a frame secured to said bridge and to the top of said sunshield, and a sheet of transparent material carried by said frame and bearing indicia.

6. In a vehicle body front end construction, the combination with a windshield header, of a bridge projecting forwardly from said header, a sheet of transparent material located above said bridge and disposed substantially parallel to said header, a frame for said sheet having separable overlapping portions arranged in overlapping relation upon said bridge, and a common means for holding together said overlapping portions and securing the same to said bridge.

7. In a vehicle body front end construction, the combination with a windshield header and a windshield suspended from said header, of a bridge secured between said windshield and header and projecting forwardly therefrom, a sunshield secured to said header adjacent the upper edge thereof and projecting forwardly therefrom, and a sheet of transparent material secured between said bridge and sunshield in substantially parallel relation to said header.

8. In a vehicle body front end construction, the combination with a windshield header, of a bridge secured to said header at the lower edge thereof and projecting forwardly therefrom, a sunshield secured to said header adjacent the upper edge thereof and projecting forwardly therefrom, and a sheet of transparent material secured between said bridge and sunshield in substantially parallel relation to said header.

In testimony whereof I affix my signature.

FRANK RUSSELL VALPEY.